(12) United States Patent
Sayyah et al.

(10) Patent No.: US 7,174,064 B2
(45) Date of Patent: Feb. 6, 2007

(54) OPTICAL CHANNELIZER UTILIZING RESONANT MICROSPHERE COUPLING

(75) Inventors: Keyvan Sayyah, Santa Monica, CA (US); Hossein Izadpanah, Thousand Oaks, CA (US); David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 107 days.

(21) Appl. No.: 10/873,898

(22) Filed: Jun. 21, 2004

(65) Prior Publication Data

US 2004/0228638 A1  Nov. 18, 2004

Related U.S. Application Data

(62) Division of application No. 09/897,713, filed on Jun. 29, 2001, now Pat. No. 6,778,318.

(51) Int. Cl.
*G02B 6/26* (2006.01)
*G02B 6/28* (2006.01)

(52) U.S. Cl. ............................ 385/15; 385/24; 385/27

(58) Field of Classification Search ................ 385/15, 385/24, 27
See application file for complete search history.

(56) References Cited

U.S. PATENT DOCUMENTS

| | | | |
|---|---|---|---|
| 4,726,011 A | 2/1988 | Ih et al. | 370/3 |
| 5,016,242 A | 5/1991 | Tang | 370/3 |
| 5,347,525 A | 9/1994 | Faris | 372/19 |
| 5,457,561 A | 10/1995 | Taneya et al. | 359/172 |
| 5,600,471 A | 2/1997 | Hirohashi et al. | 398/136 |
| 5,661,582 A | 8/1997 | Kintis et al. | 359/172 |
| 5,818,619 A | 10/1998 | Medved et al. | 359/172 |
| 5,880,865 A | 3/1999 | Lu et al. | 359/125 |
| 5,896,211 A | 4/1999 | Watanabe | 359/124 |
| 5,978,117 A | 11/1999 | Koonen | 359/125 |
| 6,009,115 A | 12/1999 | Ho | 372/92 |

(Continued)

FOREIGN PATENT DOCUMENTS

EP    0 835 035 A1    4/1998

(Continued)

OTHER PUBLICATIONS

Little et al, "Microring Resonator Channel Dropping Filters", Journal of Lightwave Technology, vol. 15, No. 6, Jun. 1997, pp. 998-1005.*

(Continued)

*Primary Examiner*—John D. Lee
(74) *Attorney, Agent, or Firm*—Ladas & Parry LLP (57) ABSTRACT

In a method and apparatus for converting optical wavelength division multiplexed channels to wireless channels, the information carrying optical carriers are first de-multiplexed and each optical carrier is then extracted from the data using an optical channelizing technique. The optical frequency of each of the extracted optical carriers is then shifted by an amount equal to the desired wireless carrier frequencies in the broadband wireless channels. Optical heterodyning of the frequency-shifted extracted lightwave carriers with the original data-containing optical signals, which are mutually in phase coherence, in a photodetector results in a set of wireless carriers each modulated with the data carried by the corresponding optical channel.

21 Claims, 6 Drawing Sheets

U.S. PATENT DOCUMENTS

| | | | |
|---|---|---|---|
| 6,239,888 B1 | 5/2001 | Willebrand | 359/118 |
| 6,389,197 B1* | 5/2002 | Iltchenko et al. | 385/28 |
| 6,487,233 B2* | 11/2002 | Maleki et al. | 372/108 |
| 6,488,861 B2* | 12/2002 | Iltchenko et al. | 216/24 |
| 6,580,851 B1* | 6/2003 | Vahala et al. | 385/30 |
| 6,891,997 B2* | 5/2005 | Sercel et al. | 385/30 |
| 2001/0053011 A1 | 12/2001 | Imajo | 359/173 |

FOREIGN PATENT DOCUMENTS

| | | |
|---|---|---|
| EP | 0 876 020 A1 | 11/1998 |
| EP | 0 887 965 A1 | 12/1998 |
| EP | 0 993 124 A2 | 4/2000 |
| JP | 2000-147306 | 5/2000 |
| JP | 2000-315983 | 11/2000 |
| JP | 2001-103545 | 4/2001 |
| WO | 00/16489 | 3/2000 |
| WO | 00/29886 | 5/2000 |
| WO | 01/26263 A2 | 4/2001 |
| WO | 01/86982 A1 | 12/2001 |

OTHER PUBLICATIONS

Cai, M., et al., "5-Gbit/s BER Performance on an All Fiber-Optic Add/Drop Device Based on a Taper-Resonator-Taper Structure," *IEEE Photonics Technology Letters*, vol. 12, No. 9, pp. 1177-1179 (Sep. 2000).

Cai, M., et al., "Observation of Critical Coupling in a Fiber Taper to a Silica-Microsphere Whispering-Gallery Mode System," *Physical Review Letters*, vol. 85, No. 1, pp. 74-77 (Jul. 3, 2000).

Cai, M., et al., "Fiber-coupled microsphere laser," *Optics Letters*, vol. 25, No. 19, pp. 1430-1432 (Oct. 1, 2000).

Cai, M., et al., "Fiber-Optic Add-Drop Device Based on a Silica Microsphere-Whispering Gallery Mode System," *IEEE Photonics Technology Letters*, vol. 11, No. 6, pp. 686-687 (Jun. 1999).

Logan, Jr., R.T., "All-Optical Heterodyne RF Signal Generation Using a Mode-Locked-Laser Frequency Comb: Theory and Experiments," *IEEE International Microwave Symposium Digest*, Paper #TH4C-2, 4 pages (Jun. 15, 2000).

Kitayama, K., "Highly Stabilized Millimeter-Wave Generation by Using Fiber-Optic Frequency-Tunable Comb Generator," *Journal of Lightwave Technology*, vol. 15, No. 5, pp. 883-893 (May 1997).

Coppin, P. and T.G. Hodgkinson, "Novel Optical Frequency Comb Synthesis Using Optical Feedback," *Electronics Letters*, vol. 26, No. 1, pp. 28-30 (Jan. 4, 1990).

Maleki, L., "Technical Support Package on Whispering-Gallery-Mode Microspheres as Light Modulators," *Nasa Tech Brief*, vol. 24, No. 11, 10 pages (Nov. 2000).

Ohteru, S. and Noboru Takachio, "Methodology of Unequally Spaced Frequency Allocation for WDM Transmission Systems Using Typical Dispersion-Shifted Fiber Cable," *IEICE Trans. Commun.*, vol. E83-B, No. 6, pp. 1290-1297 (Jun. 2000).

JDS Uniphase, Product Information for FBG1500-ADM Series—Fiber Bragg Circulated Fixed Add/Drop Modules and WD1515 A1/D1—100 GHz Spaced ITU-Channel Add/Drop WDM Couplers, 2 pages <http: //www.jdsunph.com/HTML/catalog/prod>, (May 7, 1998).

Giganet Corp., Product Information for EtherAir 1500™ —2×100 Base-TX over OC-3/STM-1, 6 pages <http://www.giganet-corp.com/1500100/html>, Jul. 2000.

Sicom Incorporated, Product Information for DVB Satellite Modulator Products, 1 page <http://www.sicom.com/sicom/products/html>, Jul. 2000.

Sicom Incorporated, Product Information for SM7060 Programmable Digital Modulator ASIC and MC2470 Modulator Circuit Card, 6 pages, Apr. 2000.

Gould Fiber Optics, Product Information for Wavelength Division Multiplexers, 5 pages, no date given.

Ceragon Networks, Product Information for FibeAir 3100 and FibeAir 6200, 4 pages, 2000.

ICS LaserSpeed Solutions, Product Information for SkyNet™ 500 Series—Quick Connectivity for 100 Mbps Fast Ethernet, 2 pages, 1999.

Novak, D., "Signal Generation Using Pulsed Semiconductor Lasers for Application in Millimeter-Wave Wireless Links," *IEEE Transactions on Microwave Theory and Techniques*, vol. 43, No. 9, Part 2, pp. 2257-2262 (Sep. 1995).

* cited by examiner

OPTICAL CHANNELIZER UTILIZING RESONANT MICROSPHERE COUPLING

This patent application is divisional application of U.S. application Ser. No. 09/897,713, filed on Jun. 29, 2001 (now U.S. Pat. No. 6,778,318). This patent application is related to U.S. Patent application Ser. No. 10/873,897 filed on Jun. 29, 2001, which is another divisional application of U.S. patent application Ser. No. 09/897,713.

FIELD OF THE INVENTION

The present invention relates to converting optical data signals to radio frequency data signals. More specifically, the present invention relates to converting broadband data transmitted on optical carriers in conventional wavelength-division-multiplexed (WDM) networks to corresponding microwave or millimeter wave carriers that support the continued broadband transmission of the data.

BACKGROUND OF THE INVENTION

Wavelength Division Multiplexing (WDM) is a basic technology of networking optical signals. It is a technique by which a single fiber is used to carry many separate and independent optical channels. Each channel within the optical wavelength division multiplexed (OWDM) network is assigned a separate optical wavelength at which it is transmitted through the network. In a "sparse" OWDM system, the optical wavelengths are (relatively) widely separated. For example, two optical wavelengths of 1300 nm and 1550 nm may be used in a sparse system. Such a system has an advantage of being easily implemented, but a major disadvantage is the limited number of optical channels that can be carried. In a "dense" OWDM system, the optical wavelengths are closely spaced. In a typical dense optical wavelength division multiplexed (DOWDM) system, the channel spacing may be as small as 1 nm or less. DOWDM systems provide substantially more channels than a sparse system, but are also more complex and difficult to implement.

OWDM technology provides the ability, in a given network, to allocate different services (or area of coverage) to different optical wavelengths for direct addressing. One example is in hybrid fiber coax WDM technology, where each service (broadcast video, pay per view, etc.) or different housing communities are routed by a designated wavelength in a Passive Optical Network (PON) architecture. Allocation of different services to different wavelengths simplifies the distribution of these services via optical networks, since the distribution hardware used in the networks does not need to know the type of service carried at each wavelength.

OWDM networks provide the capability to transmit large amounts of data between locations, but they have a fundamental limitation. OWDM networks require the use of optical fiber to move data from one point to another. Hence, OWDM networks may not serve areas where installation and maintenance of optical fiber is difficult and expensive. These areas may comprise rural areas where there are few users and these users are separated by significant distances, making the provision of fiber uneconomical. These areas may also include densely populated urban areas where the costs of interfering with the infrastructure and providing OWDM fiber to multiple locations may be prohibitively expensive.

OWDM networks may still be deployed in these areas, but they will generally be deployed in a relatively small area, servicing users who are closely located. Links to users on other networks may be accomplished by tying the networks together through the use of OWDM fiber or through the use of lower performing non-WDM data links. Coupling the separate OWDM networks through the use of OWDM fiber has the difficulty and expense factors discussed above. Non-WDM data links (such as radio frequency links or telephone lines) can be provided at a lower cost, but the networking capabilities inherent in a WDM network are lost.

A system for linking separate OWDM networks is described and claimed in the copending patent application entitled "Wireless Wavelength Division Multiplexed System," Ser. No. 09/897,747, filed on Jun. 29, 2001. The present patent application discloses the conversion of data transported on each optical wavelength in an OWDM system to a corresponding microwave or millimeter-wave frequency in a one-to-one correspondence. One technique which may be used for converting the several modulated optical carriers in an OWDM network to modulated radio frequency carriers transporting the same information as in the OWDM network, is to first de-multiplex the OWDM optical carriers and then detect the information in each channel using separate photodetectors. The photodetectors essentially convert the optical signals to electrical signals. The data in the individual electrical signals then modulates separately generated radio frequency carriers for wireless transmission with a one-to-one correspondence to the optical channels in the OWDM network.

However, the generation of low phase noise signals at microwave or millimeter wave frequencies using standard electrical frequency synthesizers may be a costly process, since several multiplication stages of a high quality, low frequency signal to the microwave or millimeter wave frequencies are required. Also, frequency synthesizers capable of this task can be quite bulky. Therefore, as the number of channels in the OWDM system, and hence in the converted wireless link, increases, the use of standard electrical frequency synthesizers to provide the required conversion can become detrimental in terms of cost and size.

Therefore, there exists a need in the art for apparatus and methods that provide for the conversion of the optical channels in OWDM system to radio frequency channels in a less costly and bulky fashion.

SUMMARY OF THE INVENTION

An object of the present invention is to provide a method and apparatus for converting optical channels in an OWDM network to wireless channels that may be radiated in free-space, in which the wireless channels have a one-to-one correspondence with the optical channels. It is a further object of the present invention to provide for conversion of the optical channels to wireless channels with a system that is small and inexpensive.

The present invention provides a method and apparatus for optical data channel to wireless data channel conversion. In addition, the present invention provides a method and apparatus for extracting optical carriers from optical data channels.

An optical to wireless converter according to the present invention, where the converter receives optical channels modulated at optical carrier frequencies and transmits corresponding wireless channels modulated at wireless carrier frequencies, comprises: a channelizer receiving the optical channels and producing extracted optical carrier signals; an optical frequency shifter receiving the extracted optical carrier signals and producing frequency-shifted extracted optical carrier signals; an optical heterodyne detector receiving the frequency-shifted extracted optical carrier signals and the optical channels and producing the corresponding wireless channels. The converter may additionally produce unmodulated wireless carrier signals. Preferably, the channelizer comprises an array of microsphere-based resonators in either a parallel or serial arrangement.

A method for converting optical data channels modulated at different optical carrier frequencies to wireless data channels modulated at different wireless carrier frequencies according to the present invention comprises the steps of: filtering the optical data channels to extract optical carrier frequency signals; frequency shifting the extracted optical carrier frequency signals by frequencies equal to corresponding wireless frequency carrier signals; and optically heterodyning the optical data channels and the frequency-shifted extracted optical carrier signals to generate wireless data channels modulated at the corresponding wireless carrier frequencies.

A converter according to the present invention for converting optical channels from an optical wavelength division multiplexed network to data modulated wireless channels in a one-to-one correspondence between the optical channels and the wireless channels, where the optical channels are combined in a composite optical signal, comprises: a wavelength division demultiplexer receiving the composite optical signal and producing demultiplexed optical channels; a channelizer receiving demultiplexed optical channels and producing extracted optical carrier signals, each extracted optical carrier corresponding to a different optical channel; a first optical combiner combining each extracted optical carrier signal, the first optical combiner forming a composite extracted optical carrier signal; an optical frequency converter receiving each extracted optical carrier signal, the optical frequency converter generating frequency-shifted extracted optical carrier signals, where the optical frequency converter shifts each extracted optical carrier signal by a different wireless carrier frequency to form the frequency-shifted extracted optical carrier signals; a second optical combiner receiving the frequency-shifted extracted optical carrier signals to form a composite frequency-shifted extracted optical carrier signal; an optical-heterodyne detector receiving the composite optical signal, the composite extracted optical carrier signal, and the composite frequency-shifted extracted optical carrier signal, the optical-heterodyne detector producing the data modulated wireless channels at the different wireless carrier frequencies, such that each wireless channel corresponds to a particular original optical channel.

An optical channelizer, according to the present invention, for filtering optical data signals to extract a plurality of unmodulated optical carriers comprises an array of microresonators, each microresonator of the array of microresonators comprising: a microsphere having a resonance; an input fiber disposed adjacent to the microsphere and coupling optical energy to the microsphere; and an output fiber disposed adjacent to the microsphere and coupling optical energy from the microsphere, where the resonance of the microsphere in each microresonator corresponds to an optical frequency of one unmodulated optical carrier of the plurality of unmodulated optical carriers.

An optical channelizer according to the present invention for filtering optical data signals to extract a plurality of unmodulated optical carriers, comprises: a fiber bus; and a plurality of microspheres, each microsphere being coupled to the fiber bus to receive optical energy, and each microsphere producing a corresponding unmodulated optical carrier A method for filtering a composite optical signal containing a plurality of modulated optical data signals to extract a plurality of unmodulated optical carriers according to the present invention comprises the steps of: demultiplexing the composite optical signal to generate demultiplexed optical data signals; coupling each demultiplexed optical data signal to a corresponding microsphere in an array of microspheres; perturbing the corresponding microsphere to have resonance at or near an optical carrier frequency of the demultiplexed optical data signal coupled to the microsphere; and coupling the unmodulated optical carrier from the microsphere.

A method of filtering a composite optical signal containing a plurality of optical data signals to extract a plurality of extracted unmodulated optical carriers according to the present invention comprises the steps of: coupling the composite optical signal to a plurality of microspheres; perturbing each microsphere to have a different resonance, the resonance at or near an optical carrier frequency of a corresponding unmodulated optical; and coupling the corresponding unmodulated optical carrier from each microsphere to produce the plurality of extracted optical carriers.

An optical channelizer, according to the present invention, for filtering optical data signals modulating the optical carriers generated by a master mode-locked laser to extract unmodulated optical carriers comprises: an optical combiner combining the optical data signals into a composite optical signal; and a slave mode-locked and injection-locked laser receiving the composite optical signal, the slave laser being set to be below threshold and breaking into a mode-locked oscillation condition to generate an optical signal containing only the unmodulated optical carriers.

A method of filtering a composite optical signal containing a plurality of optical data signals modulating the optical carriers from a master mode-locked laser to extract unmodulated optical carriers according to the present invention comprises: coupling the composite optical signal to a slave mode-locked injection locked laser with a controllable cavity length; controlling the cavity length of the slave laser to cause it to break into a mode-locked oscillation condition, the oscillation condition creating an output signal containing only the unmodulated optical carriers; and coupling the optical output signal from the slave laser.

DETAILED DESCRIPTION OF PREFERRED EMBODIMENTS

The present invention will now be described more fully hereinafter with reference to the accompanying drawings, in which preferred embodiments of the invention are shown. This invention may be embodied in many different forms and should not be construed as limited to the embodiments set forth herein. Specifically, while the embodiments described below present examples of systems or subsystems having a single channel or four channels, the present invention is not limited to single channel or four channel embodiments.

Figure 1:
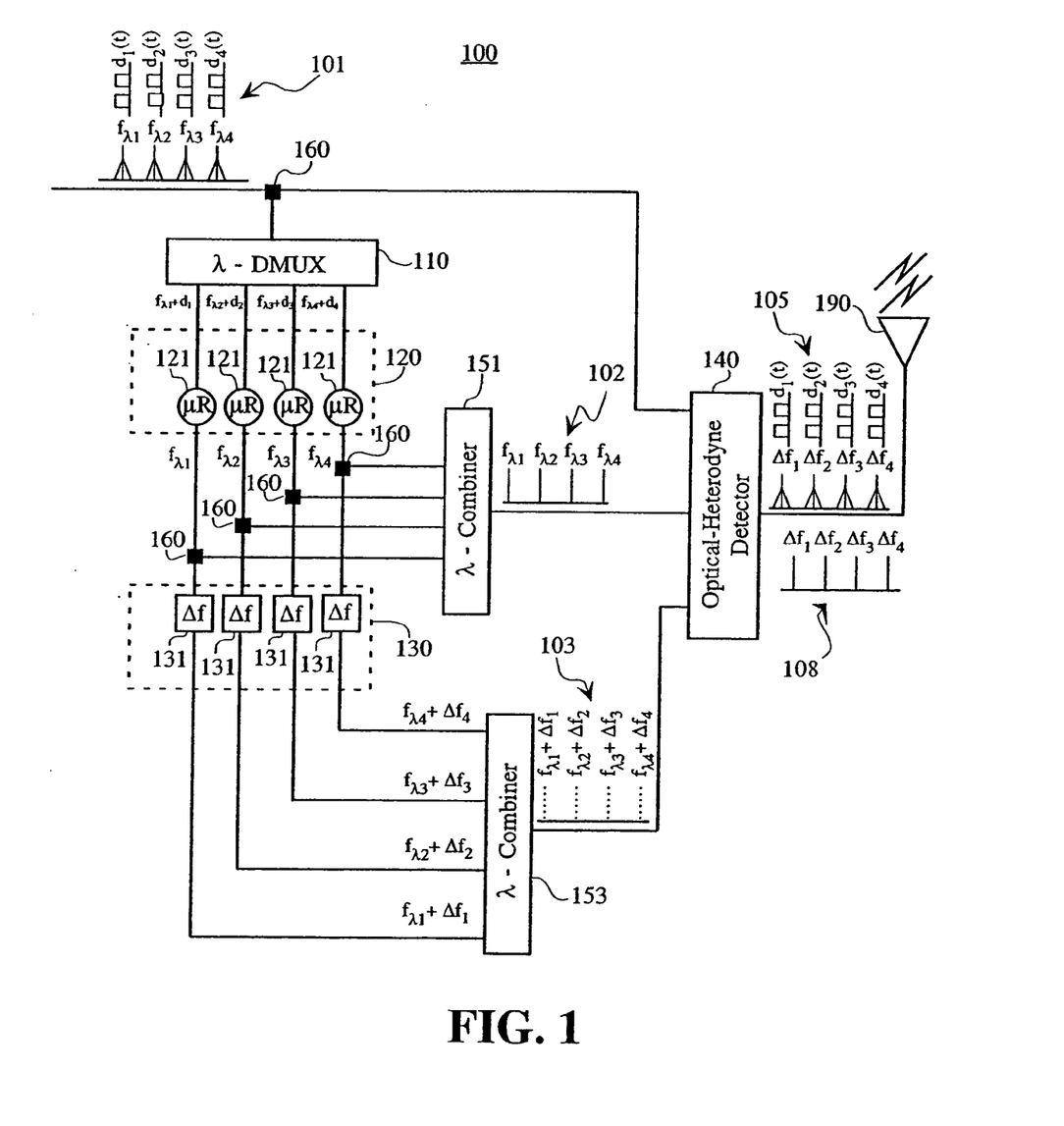
FIG. 1 shows a block diagram of an optical-to-wireless converter according to the present invention.

A block diagram of an optical frequency to wireless frequency converter system 100 according to the present invention is shown in FIG. 1. The system 100 receives a composite OWDM network optical signal 101 containing multiple optical channels in which each optical channel has a different optical carrier frequency. The spectrum of the composite optical signal 101 with four optical channels is shown in FIG. 1. Each optical channel contains an optical carrier signal, $f_{\lambda 1}$, $f_{\lambda 2}$, $f_{\lambda 3}$, $f_{\lambda 4}$, at different optical frequencies and each optical carrier signal, $f_{\lambda 1}$, $f_{\lambda 2}$, $f_{\lambda 3}$, $f_{\lambda 4}$, is modulated by broadband information, $d_1(t)$, $d_2(t)$, $d_3(t)$, $d_4(t)$. The system 100 comprises three major subsystems, an optical channelizer 120, an optical frequency converter 130, and an optical-heterodyne detector 140. Additional components, as described below, may also be used to direct optical signals through the system 100. Some of the subsystems, components, or portions thereof may be provided by optical devices well-known in the art and may also be available as commercial off-the-shelf (COTS) items.

In the optical frequency to wireless frequency converter system 100, a portion of the light energy of the composite optical signal 101 is directed to a WDM demultiplexer 10 by an optical coupler 160. The WDM demultiplexer 110 provides separate optical outputs, $f_{\lambda 1}+d_1(t)$, $f_{\lambda 2}+d_2(t)$, $f_{\lambda 3}+d_3(t)$, $f_{\lambda 4}+d_4(t)$, for each of the optical channels in the composite optical signal 101. WDM demultiplexers and optical couplers are well-known in the art and are available as COTS items. For example, dense WDM mux/demultiplexer modules from JDS Uniphase of San Jose, Calif. or Nortel Networks of Brampton, Ontario are COTS items suitable for use in embodiments of the present invention.

The optical channelizer 120 receives the separate optical outputs, $f_{\lambda 1}+d_1(t)$, $f_{\lambda 2}+d_2(t)$, $f_{\lambda 3}+d_3(t)$, $f_{\lambda 4}+d_4(t)$, from the WDM demultiplexer 120. The optical channelizer extracts the optical carrier signal from its modulating broadband information for each channel in the composite optical signal 101. Preferred embodiments of the channelizer 120 are discussed below. The extracted optical carrier signals, $f_{\lambda 1}$, $f_{\lambda 2}$, $f_{\lambda 3}$, $f_{\lambda 4}$, from the channelizer 120 are then split by couplers 160 into two separate sets of extracted optical carrier signals, $f_{\lambda 1}$, $f_{\lambda 2}$, $f_{\lambda 3}$, $f_{\lambda 4}$.

Preferably, one set of extracted optical carrier signals, $f_{\lambda 1}$, $f_{\lambda 2}$, $f_{\lambda 3}$, $f_{\lambda 4}$ is sent to a first optical combiner 151, which combines the separate extracted optical carrier signals, $f_{\lambda 1}$, $f_{\lambda 2}$, $f_{\lambda 3}$, $f_{\lambda 4}$, to form a composite extracted optical carrier signal 102. The composite extracted carrier signal 102 carries each of the optical carrier signals, $f_{\lambda 1}$, $f_{\lambda 2}$, $f_{\lambda 3}$, $f_{\lambda 4}$, at its original carrier frequency. Optical combiners are well-known in the art. Combination of the separate extracted optical carrier signals, $f_{\lambda 1}$, $f_{\lambda 2}$, $f_{\lambda 3}$, $f_{\lambda 4}$, to form the composite extracted carrier signal 102 allows a single optical fiber to be used to carry the extracted optical carrier signals to the optical heterodyne detector 140 described below. Alternatively, the optical combiner 151 may be eliminated and the separate extracted optical carrier signals, $f_{\lambda 1}$, $f_{\lambda 2}$, $f_{\lambda 3}$, $f_{\lambda 4}$, may be carried by separate fibers to the optical heterodyne detector 140.

The extracted optical carrier signals, $f_{\lambda 1}$, $f_{\lambda 2}$, $f_{\lambda 3}$, $f_{\lambda 4}$, are also sent to an optical frequency converter 130. The optical frequency converter 130 shifts the frequency of each of the extracted optical carriers by controlled amounts equal to the wireless carrier frequency of a corresponding wireless channel. The optical frequency converter 130, therefore, provides frequency-shifted extracted optical carrier signals, $f_{\lambda 1}+\Delta f_1$, $f_{\lambda 2}+\Delta f_2$, $f_{\lambda 3}+\Delta f_3$, $f_{\lambda 4}+\Delta f_4$. Preferred embodiments of the optical frequency converter 130 are described below Preferably, the frequency-shifted extracted optical carrier signals, $f_{\lambda 1}+\Delta f_1$, $f_{\lambda 2}+\Delta f_2$, $f_{\lambda 3}+\Delta f_3$, $f_{\lambda 4}+\Delta f_4$, are then combined by a second optical combiner 153, to form a composite frequency-shifted extracted optical carrier signal 103. Alternatively, the frequency-shifted extracted optical carrier signals, $f_{\lambda 1}+\Delta f_1$, $f_{\lambda 2}+\Delta f_2$, $f_{\lambda 3}+\Delta f_3$, $f_{\lambda 4}+\Delta f_4$, may be left as separate signals and sent to the optical-heterodyne detector 140.

The optical-heterodyne detector 140 receives the composite optical signal 101, the composite extracted optical carrier signal 102, and the composite frequency-shifted extracted optical carrier signal 103. As discussed above, the optical-heterodyne detector in alternative embodiments of the present invention may receive the extracted optical carrier signals and the frequency-shifted extracted optical carrier signals as separate signals. The optical heterodyne detector 140 performs optical heterodyning of the frequency-shifted extracted optical carrier signals with the original OWDM broadband signals to form a composite modulated wireless signal 105. The composite modulated wireless signal 105 contains multiple wireless channels, where each wireless channel has a wireless carrier signal modulated with the data carried in a corresponding OWDM channel in a one-to-one correspondence between the multiple optical channels and the wireless channels. The spectrum of the composite modulated wireless signal 105 with four channels at wireless frequencies is shown in FIG. 1. Since the phase coherence of the optical carriers throughout this optical process is preserved, the resulting wireless carriers will have the low phase noise required for the wireless transmission of the broadband information originally carried in the OWDM channels. The composite modulated wireless signal 105 can then be radiated with a radiating device 190, such as an antenna. Also, optically heterodyning the composite extracted optical carrier signal 102 with the composite frequency-shifted extracted optical carrier signal 103 in the optical heterodyne detector 140 results in the generation of a unmodulated composite wireless carrier signal 108. The unmodulated wireless carrier signals in the unmodulated composite wireless carrier signal 108 may then be used in other aspects of a wireless network.

Figure 2:
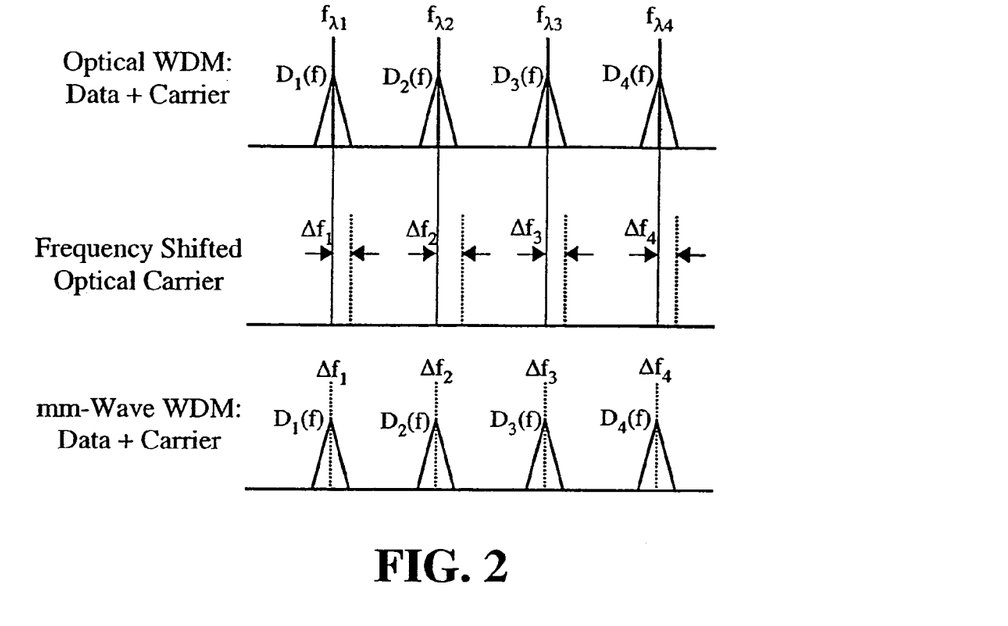
FIG. 2 shows the spectrum of example signals converted from optical to wireless frequencies.

FIG. 2 shows an example of the optical to wireless conversion provided by embodiments of the present invention with four optical WDM channels $f_{\lambda 1}$, $f_{\lambda 2}$, $f_{\lambda 3}$ and $f_{\lambda 4}$, each carrying a different service (broadband data, video, multimedia) with bandwidths of $D_1(f)$, $D_2(f)$, $D_3(f)$ and $D_4(f)$. After optical carrier extraction and frequency shifting by amounts $\Delta f_1$, $\Delta f_2$, $\Delta f_3$ and $\Delta f_4$, respectively, these lightwave carriers are heterodyned with the original WDM signals resulting in wireless carriers at $\Delta f_1$, $\Delta f_2$, $\Delta f_3$ and $\Delta f_4$ modulated with the broadband data with bandwidths $D_1(f)$, $D_2(f)$, $D_3(f)$ and $D_4(f)$, respectively. Note that although mixing between each one of the optical WDM channels and the optical carriers extracted and shifted from other WDM channels does occur in the heterodyne detector 140 (for example, mixing between $f_{\lambda 1}+D_1(f)$ signal and $f_{\lambda 2}+\Delta f_2$ carrier), the resulting signal is well over 100 GHz and hence outside the electrical bandwidth of the heterodyne detector 140. This is because the optical WDM channels are typically separated by at least 100 GHz. Furthermore, by optical heterodyning the extracted optical carrier signals, $f_{\lambda 1}$, $f_{\lambda 2}$, $f_{\lambda 3}$ and $f_{\lambda 4}$, and the frequency-shifted extracted optical carrier signals, $f_{\lambda 1}+\Delta f_1$, $f_{\lambda 2}+\Delta f_2$, $f_{\lambda 3}+\Delta f_3$, $f_{\lambda 4}+\Delta f_4$, in the heterodyne detector 140, only the wireless carrier signals, $\Delta f_1$, $\Delta f_2$, $\Delta f_3$ and $\Delta f_4$, without any data modulation may be obtained. Thus, embodiments of the present invention allow the generation of unmodulated wireless carriers alone as well as the wireless carriers modulated by the original broadband data in the WDM channels. In all the above optical processes, the phase coherence of the original optical carriers in the WDM channels are maintained, which results in low phase noise microwave or millimeter wave carrier signal generation.

There are several methods available to accomplish the optical carrier extraction function in the channelizer 120, including narrowband tunable filters, as well as nonlinear optical techniques, such as stimulated scattering adaptive filters. A preferred embodiment of the channelizer 120 uses microresonators 121, comprising narrowband passive filters. In this case, the microresonators comprise a set of high-Q filters arranged in parallel so that the modulated and wavelength de-multiplexed optical beams pass through the filter network. Examples of high-Q filters include microspheres as well as ring resonators and microdisks.

The use of microspheres as the microresonators 121 in the channelizer 120 is preferred. The scale size of the microspheres is in the range of 100 microns, resulting in a very compact channelizer module, which can be scaled to accommodate larger numbers of channels. The ensemble of elements can be viewed as a network of narrowband, passive optical cavities.

The use of microspheres in add/drop devices for WDM systems is known in the art. For example, see Cai et al., "5-Gbit/s BER Performance on an All Fiber-Optic Add/Drop Device Based on a Taper-Resonator-Taper Structure," IEEE Photonics Technology Letters, Vol. 12, No. 9, September 2000. However, in add/drop devices, the bandwidth of the microsphere must be sufficiently broad to accommodate the modulated optical signal information within the optical channel operated on by the add/drop device. For example, the bandwidth of the microsphere may be required to be on the order of several GHz to enable the selected channel with modulated information to be added to or dropped from the optical network.

Microsphere-based channelizers in embodiments of the present invention should realize an exact opposite condition from the prior art microsphere-based add/drop devices discussed above. That is, each channel of a microsphere-based channeleizer must emulate an effective add/drop filter with a bandwidth narrow enough so as to extract only the optical carrier, free of any data-bearing information. This allows the data carried within each optical channel to be stripped from the optical channel. Thus, in embodiments of the present invention, the filter passband should be limited to no more than 1 to 10 MHz, instead of the prior art, whose desired bandpass is in the range of 10 GHz or more. Therefore, it is preferred that the Q of each microsphere be as high as possible, at least from 10 million to a billion, or higher.

The Qs of microspheres have been measured to be as high as one billion. This implies that an incident broadband optical beam will emerge as a narrowband beam with a bandwidth of about 100 kHz. The Q of these extremely high-Q devices tends to degrade with time, with the Q degrading to about one million in the steady state. These lowered Qs may cause undesirable information-bearing data to be passed by the channelizer. Therefore, it is preferred that the environment of the microspheres be maintained so as to maintain the microspheres in a high Q state. For example, the microspheres may be encased in a vacuum or in an inert atmosphere, such as nitrogen or a noble gas (helium, neon, etc.). Within the enclosure, "getter" material, such as barium, may be used to absorb residual oxygen, or other chemicals that cause the Q of the microsphere to degrade.

It is anticipated that with proper engineering and packaging, the Q of high-Q microspheres can be stabilized in the 10 to 100 million range, resulting in a bandpass of 10 MHz to 1 MHz, respectively. Given that the expected input modulation bandwidth of the broadband data to be above the 100 MHz range, and that off-the-shelf diode laser sources may have linewidths in the 1–10 MHz range, this degree of filtering should be adequate in terms of extracting the optical carrier with minimal residual noise.

Figure 4:
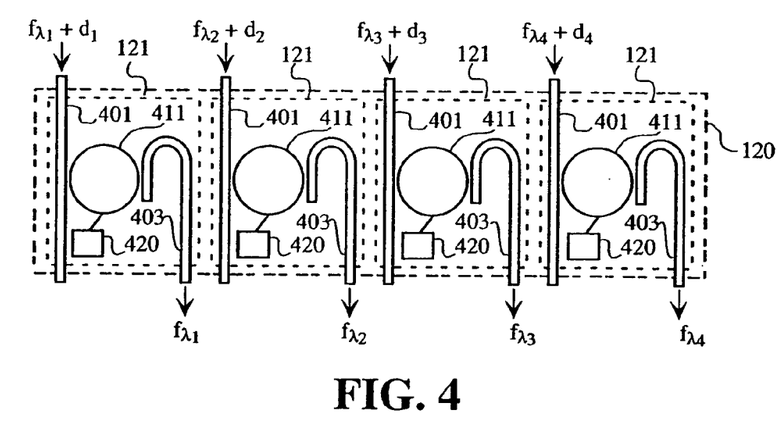
FIG. 4 shows a parallel channelizer according to an embodiment of the present invention.

In a preferred embodiment of the optical channelizer 120, the micro-resonators 121 are arranged in a parallel format following the WDM demultiplexer 110. FIG. 4 shows a parallel arrangement of the microresonators 121. In FIG. 4, each microresonator 121 comprises a microsphere 411. An input optical fiber 401 couples a modulated optical signal, $f_{\lambda 1}+d_1$, $f_{\lambda 2}+d_2$, $f_{\lambda 3}+d_3$, $f_{\lambda 4}+d_4$, with a given optical carrier frequency to the microsphere 411. An output fiber 403 couples an extracted optical carrier signal, $f_{\lambda 1}$, $f_{\lambda 2}$, $f_{\lambda 3}$, $f_{\lambda 4}$, from the microsphere 411. Preferably, the input fiber 401 and output fiber 403 are tapered in the vicinity of the microsphere 411 to provide optimum optical coupling and phase matching between the fundamental modes in the microsphere 411 and the fibers 401, 403.

Figure 5:
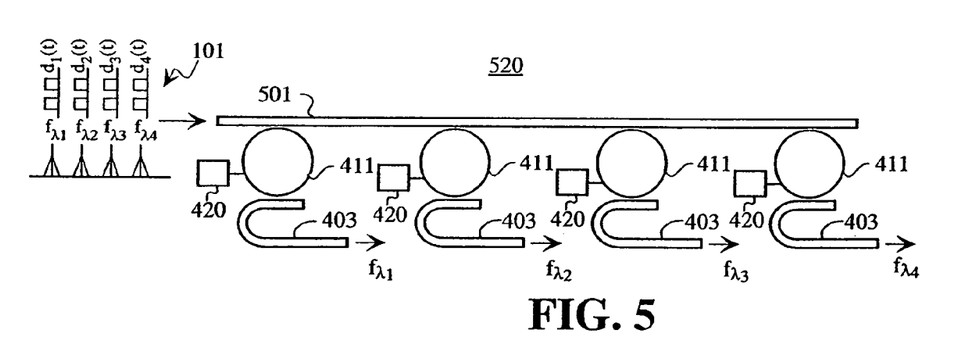
FIG. 5 shows a serial channelizer according to an embodiment of the present invention.

An alternative embodiment of a channelizer eliminates the use of a WDM demultiplexer before the channelizer to split the composite optical signal into separate optical outputs for each optical channel. FIG. 5 shows a channelizer 520 that provides separate optical carrier signals, $f_{\lambda 1}$, $f_{\lambda 2}$, $f_{\lambda 3}$, $f_{\lambda 4}$, directly from the composite optical signal 101. The channelizer 520 comprises a common optical fiber bus 501 and add/drop microspheres 411 in a serial arrangement. Each microsphere 411 is individually tuned to be resonant with a given optical carrier frequency. As the fiber bus 501 physically approaches each microsphere 411, the fiber is preferably locally tapered. The tapered region is employed to enable optimum coupling of the light into each individual microsphere 411. Light that is resonant with the microsphere (i.e., an optical carrier signal) will be coupled into the microsphere, with the coupled light then emerging into the output fiber 403, which is also preferably tapered and located adjacent the microsphere 411. Since the bandpass of the microsphere 411 is so narrow, only the optical carrier signal is retrieved and not the broadband data modulated onto the carrier. Each microsphere 411 captures and outputs an optical carrier signal, $f_{\lambda 1}$, $f_{\lambda 2}$, $f_{\lambda 3}$, $f_{\lambda 4}$, corresponding to the resonant frequency of the microsphere 411. Essentially, the channelizer 520 shown in FIG. 5 acts as a "drop" device, where a given optical carrier is "dropped" by a given microsphere 411, while the remaining carrier signals travel via the main fiber bus 501 to the other microspheres 411 to be "dropped." Alternatively, the main fiber bus 501 may be spliced to specific fiber portions in the vicinity of the microspheres 411 to simplify the fabrication of the channelizer 520.

The optical resonant frequency tuning of each microsphere in a microsphere-based channelizer may be accomplished by applying a small perturbation to each individual microsphere, with each microsphere having an independent controller. Returning to FIGS. 4 and 5, a controller 420 is coupled to each microsphere 411 to provide the perturbation of the microsphere 411 to provide resonance with a given optical carrier. The perturbation may be in the form of a temperature change (in the range of a few degrees), a pressure change, or other direct physical change that affects the resonance of the microsphere. Alternatively, a controllable amount of laser light, tuned to an absorption feature of the microsphere medium (e.g., a rare-earth-doped glass, or an absorption feature induced via a color center) may be coupled to the microsphere. The absorbed light may, as an example, modify the refractive index of the microsphere via thermally induced effects (dN/dT).

Figure 6:
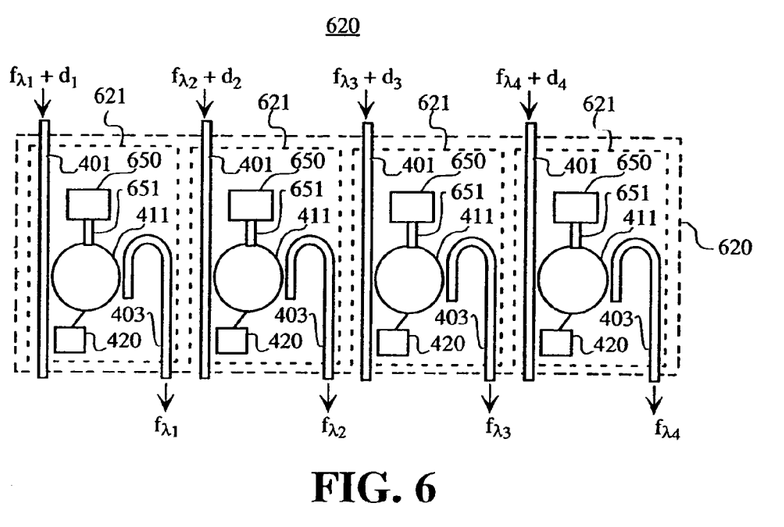
FIG. 6 shows an optically pumped parallel channelizer according to an embodiment of the present invention.
Figure 7:
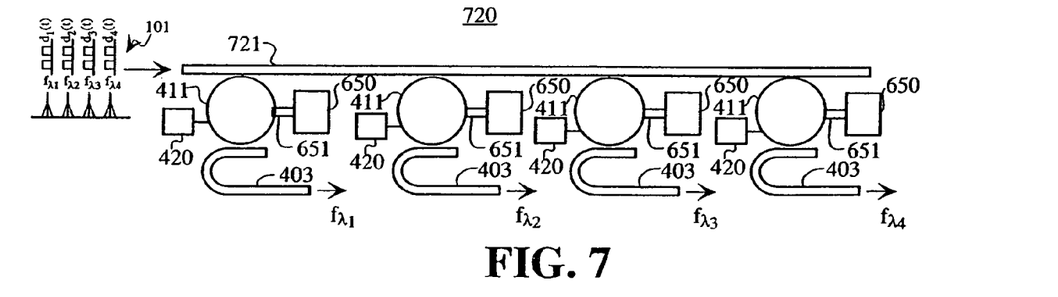
FIG. 7 shows an optically pumped serial channelizer according to an embodiment of the present invention.

Environmental losses may be of sufficient severity as to limit the ultimate Q of a given microsphere. In such a case, a microsphere having an optically pumped active laser medium (such as rare-earth doped or Raman-active material) may be used. If the active microsphere is optically pumped below its lasing threshold (i.e., the pumped light within the microsphere does not oscillate), then the optical gain present within the microsphere will, in effect, give rise to a cavity enhanced Q for the device. FIG. 6 shows a channelizer 620 having multiple microresonators 621 in which the microspheres 411 are optically pumped. In FIG. 6, optical pump energy from a pump laser 650 is coupled to each microsphere 411 by a coupling fiber 651. The optical pump laser 650 may be a laser diode or other device suitable for providing laser pump energy. Optically pumping the microsphere 411 results in a microresonator 621 that functions as an ultranarrowband filter. The bandpass of the filter may be actively controlled by varying the optical pumping power (on the order of less than 100 microwatts). A servo controller may then be used to maintain the desired bandpass over the lifetime of the device. Similarly, FIG. 7 shows a serial channelizer 720 which has an optical pump laser 650 coupled to each microsphere 411 by a coupling fiber 651. Typical wavelength for the input optical carriers may be in the 1500 nm range, whereby the laser pump wavelength may be in the 900 nm range. Therefore, alternative embodiments of channelizers may have the microspheres pumped with laser energy from the same optical fibers providing the input optical carriers.

Alternative embodiments of channelizers according to the present invention may comprise ring resonators or disk resonators. Monolithic ring or disk resonator structures fabricated as an integrated optical chip using a planar waveguide structure are known in the art. See, for example, U.S. Pat. No. 6,009,115, "Semiconductor Micro-Resonator Device," issued Dec. 28, 1999. Preferably, multiple ring or disk resonators are fabricated on a single chip. Also, the technique discussed above for improving the performance of the microsphere-based channelizer by pumping the microspheres with optical energy may also be used with ring or disk-based channelizers. That is, the ring or disk resonators comprising the microresonators in the channelizer may also be optically pumped below the lasing threshold to give rise to a cavity enhanced Q for the microresonator. The bandpass for the resulting filter can be controlled and maintained as discussed above.

Given the small size of the microresonators, whether microspheres, ring resonators, or disk resonators, the channelizer used in embodiments of the present invention is expected to be very small and robust.

An additional subsystem that may be used within embodiments of the channelizer according to the present invention is a real-time feedback controller to account for frequency drifts so that the line-center of the filter is always locked to the wavelength of the respective optical carrier it is extracting. There are several different servo-control approaches that can be used to track frequency drifts in the optical carrier. In one approach, the central frequency of the microresonator can be swept (or ramped), while measuring the transmitted optical signal. After a ramp cycle, a processor can then determine the maximum signal detected (which corresponds to the central frequency, assuming a modest modulation index) and set the filter frequency accordingly (via thermal control as an example). A related approach would be to dither the central frequency of the microresonator (via a sinusoidal thermal perturbation) and subsequently employ a phase sensitive detector (a lock-in amplifier, as an example) to then determine the required dc temperature setting. Given that the anticipated frequency drifts (thermal, mechanical, etc.) are expected to vary slowly, a rather low-bandwidth controller can suffice (100 Hz or less).

Figure 8:
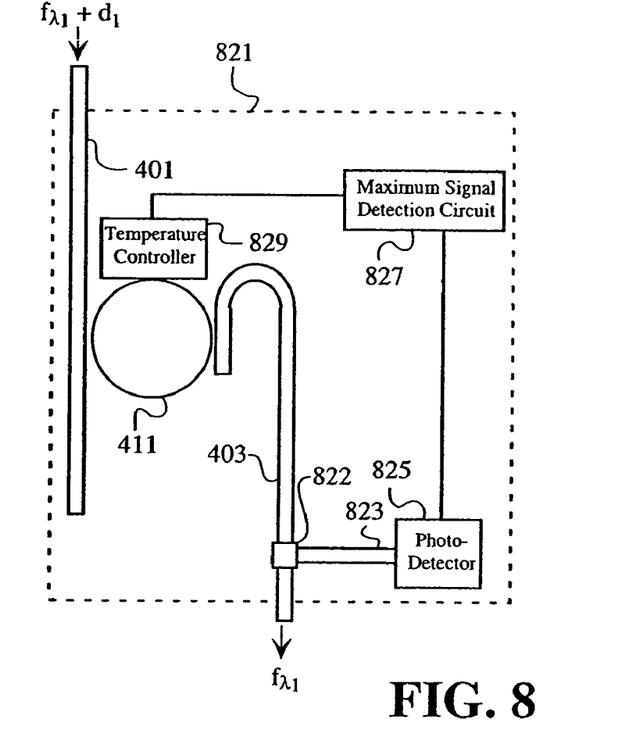
FIG. 8 shows a frequency-tuned microresonator according to an embodiment of the present invention.

One circuit that may be used for tuning a microresonator to track optical frequency drifts is shown in FIG. 8. In FIG. 8, a frequency-tuned microresonator 821 comprises the input fiber 401, the output fiber 403, and the microsphere 411. The frequency-tuned microresonator 821 additionally comprises an optical splitter 822, a photodetector waveguide 823, a photodetector 825, a maximum signal detection circuit 827, and a temperature controller 829. A small portion of the optical carrier signal, $f_{\lambda 1}$, in the output fiber 403 is split by the optical coupler 822 and coupled to the photodetector 825 by the photodetector waveguide 823. The optical carrier signal, $f_{\lambda 1}$, is detected by the photodetector 825 and converted to an electrical signal. The photodetector 825 may comprise a simple, low cost photodiode. The intensity of the electrical signal is then detected by the maximum signal detection circuit 827, which measures the time derivative of the signal to determine a maximum. Maximum signal detection circuits 827 are well known in the art. The output of the maximum signal detection circuit 827 is coupled to the temperature controller 829, which controls the temperature of the microsphere 411. The servo circuit provided by the combination of the photodetector 825, the maximum signal detection circuit 827, and the temperature controller 829 functions by dithering the temperature of the microsphere and monitoring the time derivative of the photodetector signal. A zero time derivative corresponds to a maximum temperature dependent transmission of the microsphere 411, and hence the optimum tuning of the resonator 821 with respect to the filtered optical carrier signal, $f_{\lambda 1}$.

The required temperature variation for the microsphere 411 should be on the order of a few degrees, with the necessary stability on the order of a few tenths of a degree, all well within the state of the art for controllers and compact thermoelectric (TE) devices. Given the relatively small thermal mass of the microspheres, the overall size and power consumption of the temperature controller is expected to be small. Therefore, a microsphere-based channelizer with frequency tuning is also expected to consume little power and to be relatively small.

Figure 9:
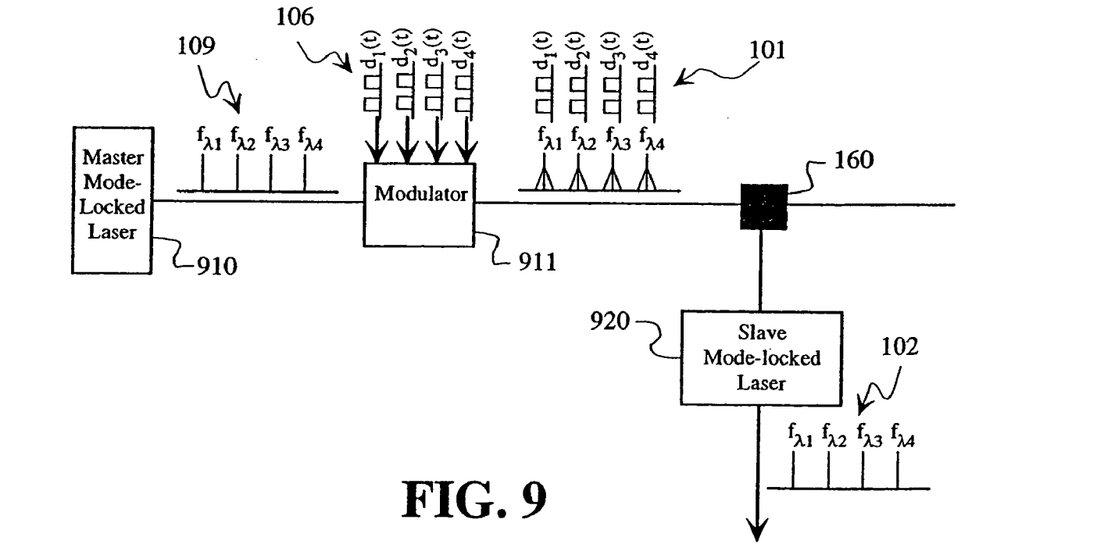
FIG. 9 shows a channelizer comprising a slave mode-locked laser according to an embodiment of the present invention.

An alternative channelizer embodiment according to the present invention may employ a mode-locked and injection-locked laser to perform the function of extracting the optical carrier from the incident signal. A system block diagram showing this alternative channelizer embodiment is shown in FIG. 9. The alternative channelizer embodiment requires that a mode-locked laser 910 be used as the source transmitter (the "master" mode-locked laser), instead of a set of free-running lasers (and, moreover, that there is negligible channel dispersion). The master mode-locked laser 910 generates multiple optical carrier signals at different optical carrier frequencies, which have a fixed phase relationship to each other due to their generation from a master mode-locked laser. Typically, the master mode-locked laser generates the multiple optical carrier signals as a composite optical carrier signal 109. Data signals 106 are then modulated by a modulator 911 onto the optical carrier signals to create the composite optical signal 101.

The channelizer in the embodiment shown in FIG. 9 comprises a slave mode-locked and injection-locked laser 920 which is nearly identical to the master mode-locked laser 910, with a controllable cavity length (in the form of a piezoelectric-driven mirror or an intracavity electro-optical phase shifter). A portion of the optical energy of the composite optical signal 101 is directed to the slave mode-locked and injection-locked laser 920 by the optical coupler 160. If the slave mode-locked and injection-locked laser 920 is set to be below threshold, then, in the presence of the composite optical signal 101, the slave mode-locked and injection-locked laser 920 will break into a mode-locked oscillation condition, with the output spectrum comprising the composite extracted optical carrier signal 102. On the other hand, the incident respective sidebands of the various optical carrier signals, corresponding to the modulating broadband data signals, will not have sufficient peak power to influence the intracavity saturable absorber and, therefore, will not produce significant output levels. Thus, in effect, the slave mode-locked and injection-locked laser 920 will be a local source that generates the composite extracted optical carrier signal 102 with extracted optical carrier signals that are phase coherent with the optical carriers in the composite optical signal 101.

Figure 3:
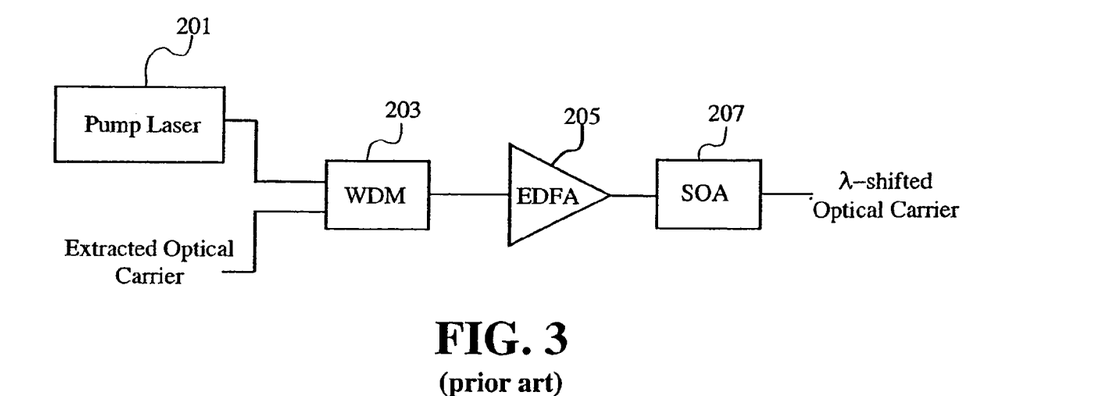
FIG. 3 (prior art) shows a block diagram of an all-optical frequency converter using four-wave mixing in a semiconductor optical amplifier.

As discussed above, the extracted optical carrier signals are frequency shifted by the optical frequency converter 130. The optical frequency converter 130 comprises a bank of optical frequency converter units 131, where each optical frequency converter unit 131 applies a specified frequency shift to a corresponding extracted optical carrier signal, with the frequency shift being in the range of wireless frequencies. All-optical techniques available for optical wavelength conversion such as cross-phase modulation, cross-gain modulation and four-wave mixing are well known in the art. In a preferred embodiment, four-wave mixing in a semiconductor optical amplifier may be employed to obtain wavelength conversion of the extracted optical carrier. FIG. 3 shows the block diagram of this prior art technique that consists of a pump laser 201, a WDM coupler 203, an Er-doped fiber amplifier (EDFA) 205 and a semiconductor optical amplifier 207. The wavelength of the pump laser 201 is tunable resulting in a controlled frequency downconversion of the input light, which, in this case, is an extracted optical carrier signal of the composite optical WDM signal. Wavelength shifts of 0–30 nm in the 1550 nm window of the EDFA are achievable, resulting in optical frequency shifts of 0–3.8 THz. The wireless frequencies of the wireless carriers are typically in the range of 20–50 GHz. Each of the extracted optical carriers are frequency-shifted by an amount equal to the wireless frequency of the corresponding wireless channels. The four-wave mixing process is a coherent one preserving the phase coherence of the extracted optical carriers of the original WDM signals.

Figure 10:
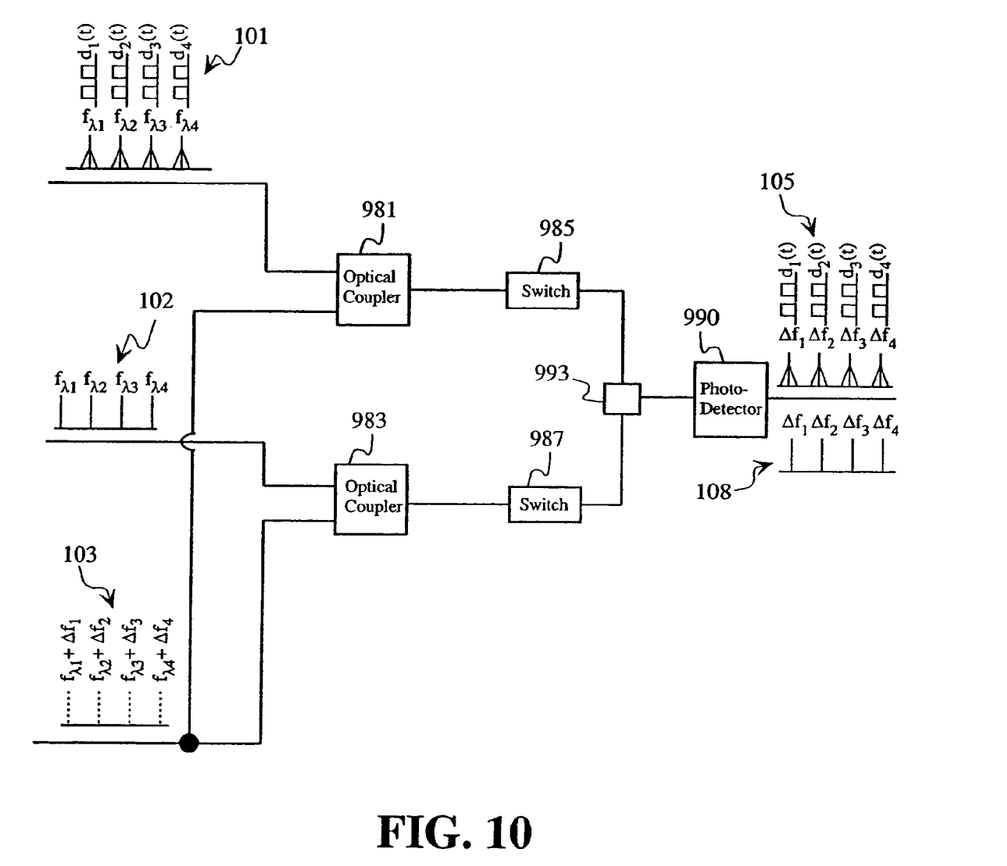
FIG. 10 shows a block diagram of an optical-heterodyne detector.

As discussed above, the optical-heterodyne detector 140 optically heterodynes the composite frequency-shifted extracted optical carrier signal 103 with the composite optical signal 101 to generate the composite modulated wireless signal 105. Optical heterodyning may be provided by a photodetector. FIG. 10 shows a block diagram for an embodiment of the optical heterodyne detector 140 using a photodetector 990. In FIG. 10, a first optical coupler 981 is used to combine the composite optical signal 101 with the composite frequency-shifted extracted optical carrier signal 103. A second optical coupler 983 is used to combine the composite extracted optical carrier signal 102 with the composite frequency-shifted extracted optical carrier signal 103. Separate optical switches 985, 987 are used to select which set of signals are to be directed by a coupler 993 to the photodetector 990 to be optically heterodyned. Preferably, the photodetector 990 comprises a high speed photodetector with a bandwidth greater than 50 GHz. Preferably, the photodetector has a maximum bandwidth that is less than the spacing of the optical carrier frequencies.

If the switches 985, 987 are configured to direct the composite optical signal 101 and the composite frequency-shifted extracted optical carrier signal 103 to the photodetector 990, the composite modulated wireless signal 105 will be generated. That is, the optical heterodyning and electrical output provided by the photodetector 990 will produce wireless channels with wireless carriers modulated with the same information as was previously present in the optical channels in a one-to-one correspondence between the optical and wireless channels. Preferably, the wireless carriers have carrier frequencies in the microwave or millimeter wave ranges. Thus, embodiments of the present invention provide for the radiation of data carried within OWDM networks at microwave or millimeter wave frequencies.

If the switches 985, 987 are configured to direct the composite extracted optical carrier signal 102 and the composite frequency-shifted extracted optical carrier signal 103 to the photodetector 990, the unmodulated composite wireless carrier signal 108 will be generated. That is, the optical heterodyning and electrical output provided by the photodetector 990 will produce wireless channels with unmodulated wireless carriers in a one-to-one correspondence between the optical and wireless channels. Preferably, the unmodulated wireless carriers have carrier frequencies in the microwave or millimeter wave ranges. Thus, embodiments of the present invention provide for the generated unmodulated wireless carriers to be used in other aspects of the wireless network.

From the foregoing description, it will be apparent that the present invention has a number of advantages, some of which have been described herein, and others of which are inherent in the embodiments of the invention described herein. Also, it will be understood that modifications can be made to the apparatus and method described herein without departing from the teachings of subject matter described herein. As such, the invention is not to be limited to the described embodiments except as required by the appended claims.

What is claimed is:

1. An optical channelizer filtering optical data signals to extract a plurality of unmodulated optical carriers, said optical channelizer comprising an array of microresonators, each microresonator of the array of micro resonators comprising:

a microsphere having a resonance;
   an input fiber disposed adjacent to the microsphere and coupling optical energy to the microsphere; and
   an output fiber disposed adjacent to the microsphere and coupling optical energy from the microsphere,
   wherein the resonance of the microsphere in each microresonator corresponds to an optical frequency of one unmodulated optical carrier of the plurality of unmodulated optical carrier, and wherein the output fiber of each microresonator is a separate output fiber for each microresonator in said array of microresonators.

2. The optical channelizer according to claim 1, wherein the microsphere has a high-Q state and the microsphere is encased in an environment to maintain the microsphere in the high-Q state.

3. The optical channelizer according to claim 1, wherein the microsphere is perturbed by a controller to maintain the resonance corresponding to the one unmodulated optical carrier signal.

4. The optical channelizer according to claim 1, wherein the microsphere is optically pumped below its lasing threshold by optical pump energy.

5. The optical channelizer according to claim 1, wherein each microresonator further comprises a frequency tuning circuit, the frequency tuning circuit detecting the maximum signal output by the microsphere and perturbing the microsphere to control the resonance of the microsphere.

6. The optical channelizer according to claim 1, wherein the input fiber and the output fiber are tapered in the vicinity of the microsphere.

7. The optical channelizer of claim 1 wherein the input fiber of each micro resonator is a common input fiber for all micro resonators in said array of micro resonators.

8. The optical channelizer of claim 1 wherein the input fiber of each micro resonator is a separate input fiber for each micro resonator in said array of micro resonators.

9. An optical channelizer filtering optical data signals to extract a plurality of unmodulated optical carriers, the channelizer comprising:

a fiber bus;

a plurality of microspheres, each microsphere being coupled to the fiber bus to receive optical energy, and each microsphere producing a corresponding one unmodulated optical carrier of the plurality of unmodulated optical carriers; and a plurality of output fibers, wherein one output fiber of the plurality of output fibers is disposed adjacent to one microsphere of the plurality of microspheres.

10. The optical channelizer according to claim 9, wherein each microsphere has a high-Q state and each microsphere is encased in an environment to maintain the high-Q state.

11. The optical channelizer according to claim 9, wherein each microsphere is perturbed by a controller to provide resonance with the corresponding one unmodulated optical carrier.

12. The optical channelizer according to claim 9, wherein each microsphere is optically pumped below its lasing threshold by optical pump energy.

13. The optical channelizer according to claim 9, further comprising a plurality of frequency tuning circuits, each frequency tuning circuit of the plurality of frequency tuning circuits coupled to a corresponding one microsphere of the plurality of microspheres, each frequency tuning circuit detecting the maximum signal output by the corresponding microsphere and perturbing the corresponding microsphere to control a resonant frequency of the corresponding microsphere.

14. A method for filtering a composite optical signal containing a plurality of modulated optical data signals to extract a plurality of unmodulated optical carriers, the method comprising:

demultiplexing the composite optical signal to generate one or more demultiplexed optical data signals;

coupling each demultiplexed optical data signal of the one or more demultiplexed optical data signals to a corresponding microsphere of an array of microspheres;

perturbing the corresponding microsphere to have resonance at or near an optical carrier frequency of the demultiplexed optical data signal coupled to the microsphere; and coupling one unmodulated optical carrier of the plurality of unmodulated optical carriers from the microsphere;

wherein each microsphere in the array of microspheres is disposed adjacent an output fiber of a plurality of output fibers.

15. The method according to claim 14, wherein each microsphere of the array of microspheres has a high-Q state and the microsphere is encased in an environment to maintain the high-Q state.

16. The method according to claim 14, further comprising: optically pumping at least one microsphere of the array of microspheres below its lasing threshold with optical pump energy.

17. The method according to claim 14, further comprising: detecting the maximum signal output by at least one microsphere; and perturbing the at least one microsphere to control the resonance.

18. A method of filtering a composite optical signal containing a plurality of plurality of optical data signals to extract a plurality of unmodulated optical carriers, the method comprising:

coupling the composite optical signal to a plurality of microspheres;

perturbing each microsphere of the plurality of microspheres to have a different resonance, the resonance at or near an optical carrier frequency of a corresponding unmodulated optical carrier of the plurality of unmodulated optical carriers; and coupling the corresponding unmodulated optical carrier from each microsphere to produce the plurality of unmodulated optical carriers;

wherein each microsphere of the plurality of microspheres is disposed adjacent an output fiber of a plurality of output fibers.

19. The method according to claim 18, wherein at least one microsphere has a high-Q state, the method further comprising: encasing the at least one microsphere in an environment to maintain its high-Q state.

20. The method according to claim 18, further comprising: optically pumping at least one microsphere below its lasing threshold with optical pump energy.

21. The method according to claim 18, further comprising: detecting the maximum signal output by at least one microsphere; and perturbing the at least one microsphere to control its resonance.

* * * * *